United States Patent [19]

Gotou

[11] Patent Number: 4,755,729
[45] Date of Patent: Jul. 5, 1988

[54] METHOD OF CONTROLLING A CONTROL SYSTEM WITH IMPROVED ROBUSTNESS TO DISTURBANCES

[75] Inventor: Makoto Gotou, Nishinomiya, Japan

[73] Assignee: Matsushita Electric Industrial Co., Ltd., Osaka, Japan

[21] Appl. No.: 22,872

[22] Filed: Mar. 6, 1987

[51] Int. Cl.[4] .............................................. H02P 5/00
[52] U.S. Cl. .................................... 318/318; 318/311; 364/167
[58] Field of Search ............... 318/318, 341, 306, 308, 318/309–312, 314–317, 326, 329, 342; 364/167, 183, 174

[56] References Cited

U.S. PATENT DOCUMENTS

| | | | |
|---|---|---|---|
| 4,153,863 | 5/1979 | Schachte et al. | 318/318 |
| 4,201,936 | 5/1980 | Roumanis | 318/318 |
| 4,346,434 | 8/1982 | Morinaga | 318/341 |
| 4,348,622 | 9/1982 | Inoue | 318/318 |
| 4,484,117 | 11/1984 | Bose | 318/341 |
| 4,656,403 | 4/1987 | Treffer | 318/341 |
| 4,661,750 | 4/1987 | Mori | 318/305 |

OTHER PUBLICATIONS

"High Accuracy Control of Servomechanism for Repeated Contouring" T. Inoue et al., Proc. 19th Annual Symp. Incremental Motion Control Systems and Devices, 1981, pp. 285–292.
"High Accuracy Control of a Proton Synchrotron Magnet Power Supply" T. Inoue et al., Proc. 8th World Congress of IFAC, 1981, pp. XX-216-XX-221.

Primary Examiner—William M. Shoop, Jr.
Assistant Examiner—David S. Martin
Attorney, Agent, or Firm—Wenderoth, Lind & Ponack

[57] ABSTRACT

A control method has a detecting step for obtaining a detected signal corresponding to a controlled variable of a controlled system and a controlling step for supplying the controlled system with a control signal corresponding to the detected signal. The controlling step includes an error signal producing step for producing an error signal corresponding to the detected signal at intervals of a detecting period of time, a storing step for producing a plurality of stored values corresponding to the error signal, and a control signal producing step for producing the control signal by mixing the error signal and one or more stored values of the storing step. The storing step renews the stored values sequentially and periodically at intervals of a renewing cycle period of time equal to Q times the detecting period, each with a value correponding to a mixed value of the error signal and one or more of the stored values having been renewed at intervals of L renewing cycle periods, where each of Q and L is an integer at least equal to 2. Preferably, the storing steps includes a filtered error signal producing step for filtering the error signal with a filter having a low-pass filter characteristic for producing a filtered error signal, and the mixed value is obtained by mixing the filtered error signal and the one or more of the stored values.

36 Claims, 7 Drawing Sheets

METHOD OF CONTROLLING A CONTROL SYSTEM WITH IMPROVED ROBUSTNESS TO DISTURBANCES

BACKGROUND OF THE INVENTION

1. Field of the Invention

This invention relates to a method of controlling a control system, and more particularly, to a method of controlling a control system required to have a good robustness to disturbances, such as a control system for a motor.

2. Description of the Prior Art

In conventional control systems, a PI controller (Proportional-Integral controller) has been widely used in order to improve the robustness to disturbances, or to supress the influences of disturbances. Recently, the PI controller can provide a digital control using a microprocessor. For example, a digital PI controller using a microprocessor for controlling the speed of a DC motor is disclosed in "Digital Control Systems", chapter 14, section 14.4, pp 689–694, written by Benjamin C. Kou and published as Holt-Saunders International Editions.

The PI controller, whether analog or digital, can improve the robustness to disturbances more at a lower frequency. However, the recent requirement to improve the robustness to disturbances has become more and more severe in some applications. For example, a control system for controlling the speed of a capstan motor in a video tape recorder requires a highly improved robustness to torque disturbances, because the size and the inertia of the capstan motor have been greatly minimized in recent years.

A new control system for improving robustness to disturbances was submitted in my previous U.S. patent application Ser. No. 917,498 filed Oct. 10, 1986. This control system has an excellent robustness to disturbances, but it requires a large RAM (random access memory) capacity which make the system expensive.

Recent integrated-circuit technology can make a small RAM capacity on a single chip microprocessor. So, it is possible to make the control system cheaper and simpler if the RAM size used is small.

SUMMARY OF THE INVENTION

It is an object of the present invention to provide a method of controlling a control system with an improved robustness to disturbances using a small RAM area (memory).

It is another object of the present invention to provide a method of controlling a control system for a motor with an improved robustness to torque disturbances using a small RAM area (memory).

These objects are achieved according to the present invention by providing a control method comprising the following steps:

a detecting steps for producing a detected signal corresponding to a controlled variable of a controlled system;

an error signal producing steps for producing an error signal corresponding to the detected signal produced in the detecting steps periodically at intervals of a detecting period of time;

a storing step for renewing a plurality of stored values sequentially and periodically at intervals of a renewing cycle period of time equal to Q times the detecting period each by a value corresponding to a first mixed value which is obtained by mixing the error signal produced in the error signal producing steps and one or more of the stored values having been renewed at intervals of L renewing cycles, where each of Q and L is an integer at least equal to 2; and a control signal producing steps for producing a control signal corresponding to a second mixed value which is obtained by mixing the error signal produced in the error signal producing step and one or more stored values stored in the storing step, and supplying the controlled system with the control signal so as to control the controlled variable of the controlled system.

BRIEF DESCRIPTION OF THE DRAWINGS

These and other objects, features and advantages of the present invention will become more apparent from the following detailed description taken with the accompanying drawings in which.

DESCRIPTION OF THE PREFERRED EMBODIMENTS

Figure 1:
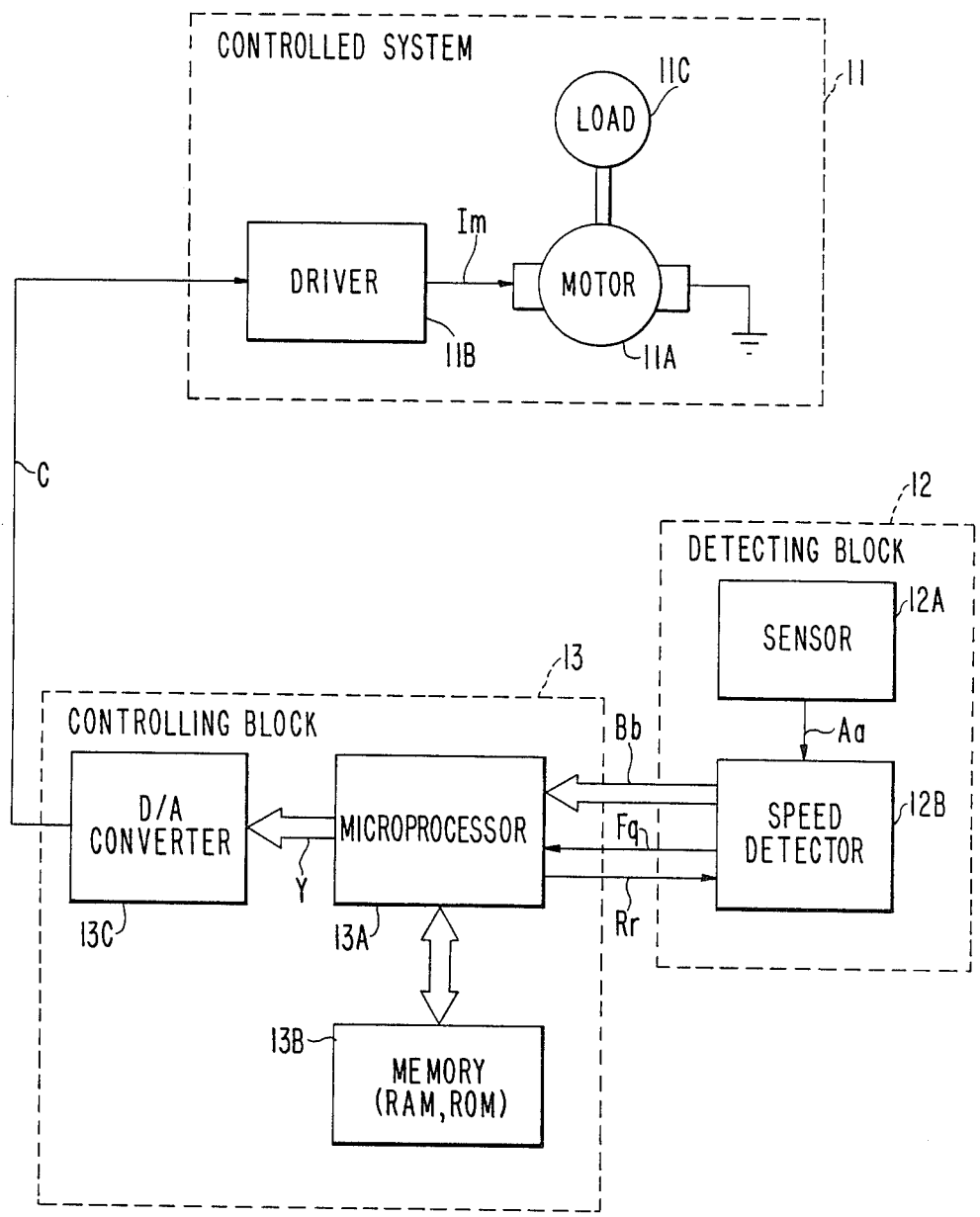
FIG. 1 is a basic block diagram of a control system for controlling the speed of a motor.

Referring now to FIG. 1, which shows a schematic construction of an embodiment of the present invention, a controlled system 11 has a DC motor 11A to be controlled and a driver 11B (a driving means) supplying the DC motor 11A with a current Im (a power). The DC motor 11A is controlled so as to rotate a load 11C (a torque disturbance source) at an aimed speed. A detecting block 12 (a detecting means) has a sensor 12A (a sensing means) and a speed detector 12B (a speed detecting means). The sensor 12A produces a sensed signal Aa with a frequency equal to Pa times the rotational frequency fm (Hz) of the DC motor 11A, where Pa is an integer at least equal to 2. For example, Pa is equal to 2000, in the case of a capstan motor of a video tape recorder. The speed detector 12B obtains a detected signal Bb and a flag signal Fq at every one or half period (detecting period) of the sensed signal Aa. The detected signal Bb is a digital or coded signal with a digital number corresponding to the one or half period of the sensed signal Aa, that is, the speed of the DC motor 11A. The flag signal Fq is set to be "H" (a high voltage)

at every timing when the speed detector 12B obtains a new detected code or value. The detail construction and operation of the speed detector 12B will be described later. A controlling block 13 (a contorolling means) has a microprocessor 13A, a memory 13B including RAM (random access memory) and ROM (read only memory), and a D/A converter 13C. The microprocessor 13A excutes the operation according to the instructions stored in the ROM of the memory 13B, so that the controlling block 13 inputs the detected signal Bb and supplying the driver 11B of the controlled system 11 with a control signal Cs corresponding to the detected signal Bb. The detail operation of the microprocessor 13A will be described later. The driver 11B supplies the DC motor 11A with the current Im corresponding to the control signal Cs so as to generate a generated torque proportional to the control signal Cs.

Thus, a control loop (a speed control loop of the DC motor 11A) is formed by the controlled system 11 (the DC motor 11A and the driver 12B), the detecting block 12 (the sensor 12A and the speed detector 12B) and the controlling block 13 (the microprocessor 13A, the memory 13B and the D/A converter 13C), so that the controlled variable of the controlled system 11 (the speed of the DC motor 11A) is controlled at the aimed value (the aimed speed).

Figure 2:
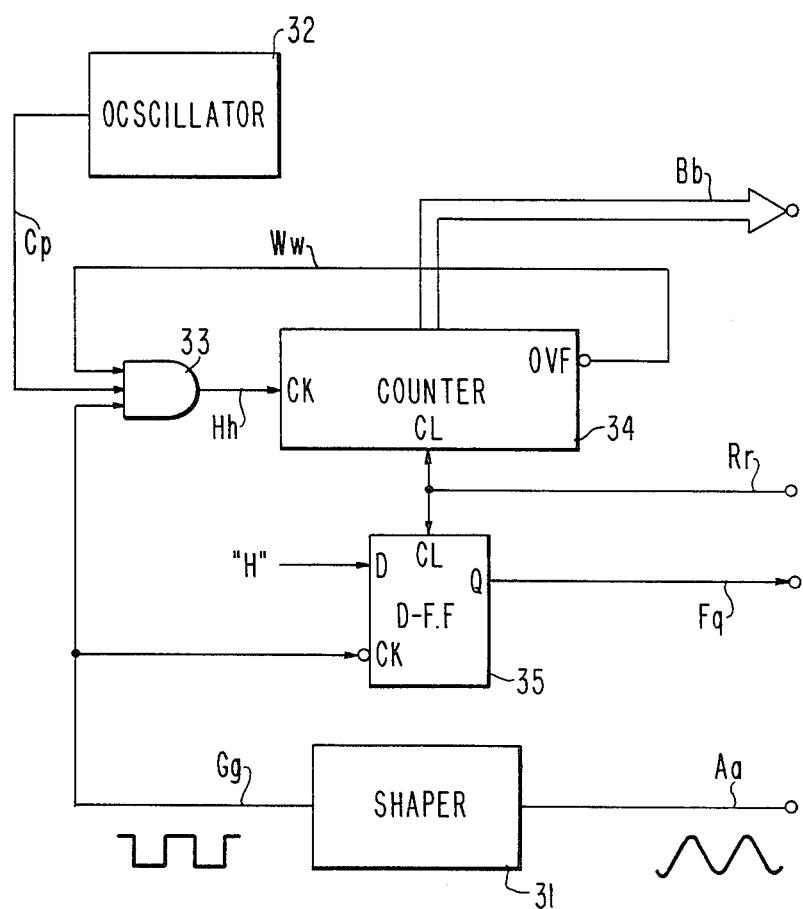
FIG. 2 is a circuit diagram of a speed detector usable in the control system shown in FIG. 1.

A construction of the speed detector 12B will be explained in detail hereinbelow. FIG. 2 shows a construction of the speed detector 12B. A shaper 31 compares the sensed signal Aa with a predetermined voltage and produces a shaped signal Gg with a squared waveform. The shaped signal Gg is applied to an input terminal of an AND circuit 33 and a trigger input terminal CK of a D-type flip-flop 35. A clock pulse signal Cp of an oscilator 32 and an overflow signal Ww of a counter 34 are respectively applied to the other input terminals of the AND circuit 33. The oscilator 32 has a crystal oscilator and a frequency divisor, for example, and it produces the clock pulse signal Cp with a frequency about 1 MHz, much higher than the frequency of the shaped signal Gg. The counter 34 has a 12 bit length and it counts up the output pulse Hh of the AND circuit 33. The overflow signal Ww of the counter 34 is "H" when the content of the counter 34 remains below a predetermined value, and the overflow signal Ww turns "L" when the content of the counter 34 becomes equal to or over the predetermined value, where "H" and "L" mean a high voltage (5 V) and a low voltage (0 V), respectively. As the data input terminal of the D-type flip-flop 35 is connected to "H", the flag signal Fq, the output signal of the D-type flip-flop 35, becomes "H" at every timing of the falling edges of the shaped signal Gg. A reset signal Rr of the controlling block 13 can reset the contents of the counter 34 and the D-type flip-flop 35, so that Bb="LLLL LLLL LLLL" and Fq="L".

The operation of the speed detector 12B of FIG. 2 will be explained hereinbelow. Assume that the contents of the counter 34 and the D-type flip-flop 35 are reset or at initial conditions and that the shaped signal Gg is "L". After the shaped signal Gg changes from "L" to "H", the counter 34 counts up the output pulse Hh of the AND circuit 33 which is the clock pulse signal Cp of the oscilator 32. At the time when the shaped signal Gg changes from "H" to "L", the output signal Hh of the AND circuit 33 becomes "L" and the counter 34 holds the content untill the next change of the shaped signal Gg. As the result of this, the held content of the counter 34 is the digital or coded number proportional to the half period of the sensed signal Aa of the sensor 12A, which is inversely proportional to the speed of the DC motor 11A. The flag signal Fq changes from "L" to "H" at a falling edge of the shaped siganl Gg. The controlling block 13 inputs the detected signal Bb, the held content of the counter 34, after checking the flag signal Fq being "H". Then, the controlling block 13 resets the contents of the counter 34 and the D-type flip-flop 35 by making the reset signal Rr "H" for a short time. This makes the counter 34 and the D-type flip-flop 35 initial conditions for preparing the next detection. Besides, the held content of the counter 34 can be a large value, when the speed of the DC motor 11A is very low during the accelerating time.

The operation of the controlling block 13 will be explained in detail hereinbelow, referring to FIG. 3 which shows a flow diagram of the operation of the microprocessor 13A. It is noted that a register name and a content stored in it are designated by a same label hereinbelow. The microprocessor 13A excutes the following tasks according to the instructions stored in the ROM of the memory 13B:

[AN ERROR BLOCK 3A (AN ERROR SIGNAL PRODUCING STEP)]

(3A-1) The flag signal Fq is checked untill the flag signal Fq becomes "H". That is, the microprocessor 13A is triggered so as to execute the following procedure at the timing when the speed detector 12B obtains a new detected code corresponding to the current speed of the DC motor 11A.

(3A-2) The detected signal Bb, the held content of the counter 34, is inputted and changed to the digital or coded value S. Then, the contents of the counter 34 and the D-type flip-flop 35 are reset by making the reset signal Rr "H" for a very short time.

(3A-3) A difference value Eo is computed between the detected value S and a predetermined value Sref corresponding to the aimed speed. That is $Eo=Sref-S$. Then, an error signal E is obtained by multiplying the difference value Eo with a predetermined positive value R. That is, $E=REo$. New value of the error signal E is detected at intervals of the detecting period equal to the period of the sensed signal Aa.

[AN OUTPUT BLOCK 3B (A CONTROL SIGNAL PRODUCING STEP)]

(3B-1) An output signal Y is obtained by mixing the error signal E and a composite value V of a composing block 3Cb in a memorizing block 3C, described later, with a ratio of 1:D, where D is a positive real at most equal to 1.5 and at least equal to 0.25.

(3B-2) The output signal Y is outputted to the D/A converter 13C as the control signal Cs of the controlling block 13.

[A MEMORIZING BLOCK 3C (A MEMORIZING STEP)]

The memorizing block 3C comprises a selecting task block 3Ca, the composing block 3Cb, a filtering error block 3Cc and a renewing block 3Cd.

<A SELECTING TASK BLOCK 3Ca>

(3Ca-1) The error signal E at this timing is stored in a register F[Q−Ia], where Q is an integer at least equal to 2 and Ia is a first count variable. That is, $F[Q-Ia]=E$.

(3Ca-2) The first count variable Ia is incremented with a modulo number Q. That is, '$Ia=Ia+1$ (MOD Q)' means '$Ia=Ia+1$ and $Ia=0$ if $Ia=Q$', because A with a modulo B means the remainder of A/B. Thus, the first count variable Ia varies from 0 to Q−1 and increments the number in a circular form at every detecting timing of the speed detector 12B.

(3Ca-3) If Ia=0, the microprocessor 13A excutes the following tasks of the composing block 3Cb, the filtering error block 3Cc and the renewing block 3Cd. If Ia is not equal to 0, that is, Ia is from 1 to Q−1, the operation of the microprocessor 13A goes back to the task of the error block 3A.

<A COMPOSING BLOCK 3Cb (A COMPOSING STEP)>

(3Cb-1) A second count variable Ib is incremented with a modulo number NL, where L is an integer at least equal to 2 and preferably equal to an integral multiple of Pa/Q and N is an positive integer including 1. That is, 'Ib=Ib+1 (MOD NL)' means 'Ib=Ib+1 and Ib=0 if Ib=NL'. Thus the second count variable Ib varies from 0 to NL−1 and increments the number in a circular form at every Q detecting timings of the speed detector 12B.

(3Cb-2) Another integer J is replaced by Ib. That is, J=Ib.

(3Cb-3) The composite value V of the composing block 3Cb is computed by combining linearly a set of N memorized values M [J−nL (MOD NL)] (n=1, ..., N) with positive coefficients Wn (n=1, ..., N) from n=1 to n=N, where the N memorized values M[J−nL (MOD NL)] (n=1, ..., N) have been renewed at intervals of L renewing cycles. That is, $$V = \sum_{n=1}^{N} Wn\, M(J - nL\ (MOD\ NL)) \quad (1)$$

where $$0 < Wn < 2/N\ (n = 1, \ldots, N) \quad (2)$$

$$\sum_{n=1}^{N} Wn = 1 \quad (3)$$

Preferably, $$Wn = 1/N\ (n = 1, \ldots, N) \quad (4)$$

so as to make the computation of the composite value V easier. Notice that the set of N memorized value here for computing the composite value V can be only one memorized value, which is substituted to the composite value V.

<A FILTERING ERROR BLOCK 3Cc (A FILTERED ERROR SIGNAL PRODUCING STEP)>

(3Cc-1) A filtered error signal Ec is computed by combining linearly a plurality of values F[m] (m=1, 2, ..., Fd) which are values of the error signal E sequential with respect to the timings obtained, where Fd is a positive integer at least equal to 2 and at most equal to 2Q. That is, $$Ec = \sum_{m=1}^{Fd} Bm\, F(m), \quad (5)$$

where the coefficients Bm are positive and have the following relationships:

$$B_m = B_{Fd-m}\ (m = 1,2,\ldots,Fd/2) \quad (6)$$

$$\sum_{m=1}^{Fd} Bm = 1 \quad (7)$$

the values F[m] (m=1, 2, ..., Q) are transferred to the registers F[Q+m] (m=1, 2, ..., Q), respectively. Notice that the values F[m] (m=1, 2, ..., 2Q) at the computing timing of the filtered signal Ec are those of the error signal E sequential with respect to timings obtained. Notice also that the filtering error block 3Cc with the relationships of Eq. (5) to Eq. (7) has a low-pass digital filter characteristics which has a gain almost equal to 1 at a lower frequency region and a reduced gain much smaller than 1 at a higher frequency region.

<A RENEWING BLOCK 3Cd (A RENEWING STEP)>

(3Cd-1) A memorized value M[Ib], stored at the address corresponding to the second count variable Ib in the RAM of the memory 13B, is renewed by a mixed value of the filtered error signal Ec and the composite value V of the composing block 3Cb with a ratio of 1:1. That is, M[Ib]=Ec+V. The renewed memorized value M[Ib] is held until the next renewing time of M[Ib], that is, the NL renewing cycles later. As the result of this, the NL memorized values M[0] to M[NL−1] are obtained, and the NL memorized values are sequentially and periodically renewed at intervals of the renewing cycle period equal to Q times the detected period. After the excution of the task of the renewing block 3Cd, the operation of the microprocessor 13A goes back to the task of the error block 3A.

The method of controlling a control system of the embodiment of the present invention shown by the combination of FIG. 1, FIG. 2 and FIG. 3 has a remarkably improved robustness to disturbances, which will be explained in detail hereinbelow. FIG. 4 shows a control block diagram of this embodiment. The controlled system 11 comprises a driver block 51 having a gain Ba of the driver 11B, a torque constant block 52 having a torque constant Kt of the DC motor 11A, a mixing point block 53 subtracting a load torque Td of the load 11C (a torque disturbance) from a generated torque Tm of the DC motor 11A, and an inertia block 54 having a transfer function of Ki/(Jm s), where Jm is a composed inertia of the DC motor 11A and the load 11C, Ki is a constant and 1/s is the Laplace integral operator. The speed fm of the DC motor 11A in the controlled system 11 is detected by the detecting block 12 having a gain Kv. The controlling block 13 comprises the error block 3A, the output block 3B and the memorizing block 3C having the composing block 3Cb, the filtering error block 3Cc and the renewing block 3Cd. The error block 3A has a mixing point block 61, for obtaining a difference value Eo between the detected value S and the predetermind value Sref, and a proportional gain block 62 having a gain R. The output block 3B has a gain block 71 having the gain D and a mixing point block 72 adding the error signal E and the composite value V of the memorizing block 3C. The output block 3B supplies the driver block 51 of the controlled system 11 with the output signal Y as the control signal Cs. The filtering error block 3Cc produces the filtered error signal Ec by combining linearly Fd of values of the error signal E sequential with respect to timings obtained. The renewing block 3Cd in the memorizing block 3C renews one of the memorized values, M[Ib], with a mixed value of the filtered error signal Ec and the composite value V of the composing block 3Cb. The composing block 3Cb computes the composite value V, which is a linear combination of a set of N memorized values having been renewed at intervals of L renewing cycles with the positive coefficients Wn (n=1, ..., N). In FIG. 4, $Zd^{-1}$ and $Zr^{-1}$ mean time delays of one detecting period Td and one renewing cycle period Tr, respectively. That is, $$Zd^{-1} = \exp(-sTd) \tag{8}$$

$$Zr^{-1} = \exp(-sTr) \tag{9}$$

The renewing cycle period is equal to Q times the detecting period, so $$Tr = QTd \tag{10}$$

Figure 5:
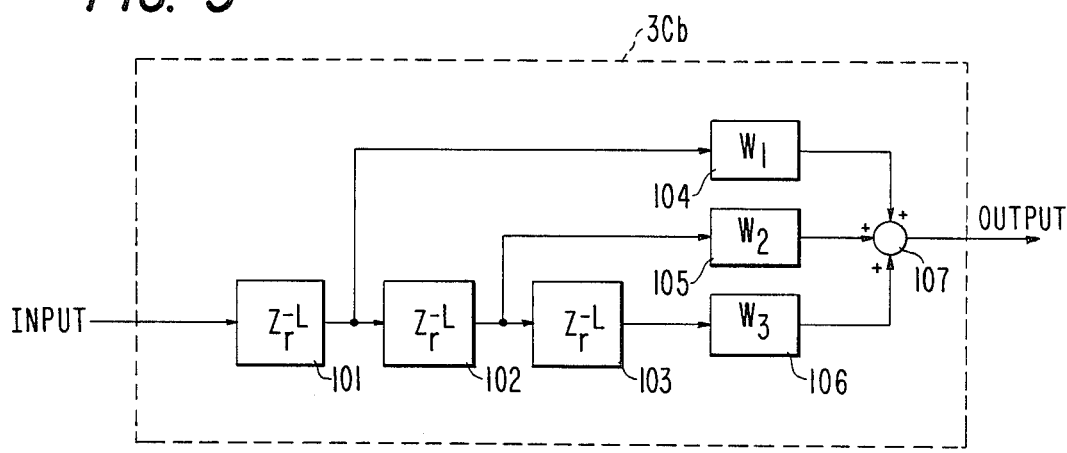
FIG. 5 is a block diagram showing an example of a transfer function of the composing means used in FIG. 3 with the relationship $N=3$.

The detail block diagram of the composing block 3Cb with the relationship N=3 is shown in FIG. 5, for example. In FIG. 5, the transfer function of the composing block 3Cb has a series of three delay elements 101, 102 and 103 and produces an output signal (a composite value) by combining linearly the output signals of the three delay elements 101, 102 and 103 with the coefficients W1, W2 and W3, respectively, by coefficient circuits 104, 105 and 106, where each of the three delay elements 101, 102 and 103 delays for a time of L renewing cycles. Thus, the memorizing block 3C in the controlling block 13 has a positive feedback loop at a bypass from the error signal E to the control signal Cs, and the positive loop includes serially a transfer function which has a series of N delay elements and produces an output signal (a coposite value) by combining linearly the output signals of the N delay elements with the positive coefficients Wn (n=1, ..., N), where each of the N delay elements delays for the time of L renewing cycles. The controlling block 13 supplies the driving block 51 of the controlled system 11 with the control signal Cs, and the DC motor 11A generates the generated torque Tm proportional to the control signal Cs.

The robustness to disturbances in the control system of this embodiment is represented by the transfer function from the torque disturbance Td to the speed fm of the DC motor 11A, which is $$Gx(s) = -\frac{fm}{Td} \tag{11}$$

$$= \frac{Kj/(Jm\, s)}{1 + (Kv\, R\, Ba\, Kt\, Kj)/\{Jm\, s\, H(s)\}}$$

where $$H(s) = \frac{1 - \sum_{n=1}^{N} Wn\, Zr^{-nL}}{1 - \{1 - D\, F(Zd)\} \left( \sum_{n=1}^{N} Wn\, Zr^{-nL} \right)} \tag{12}$$

$$F(Zd) = \sum_{m=1}^{Fd} Bm\, Zd^{-m} \tag{13}$$

The frequency transfer function Gx(jω) of Eq. (11) with the relationship s=jω is approximated as the following equation in a lower part of the controlled frequency region:

$$Gx(j\omega) = Go(j\omega) H(j\omega) \tag{14}$$

where $$Go(j\omega) = 1/(KvRBaKtKi) \tag{15}$$

The frequency transfer function Go(jω) represents the conventional robustness to disturbances of the conventional control system having no memorizing block 3C. Eq. (14) means that the present robustness to disturbance Gx(jω) of the embodiment according to the present invention is the multiple of the frequency transfer function H(jω) and the conventional robustness to disturbance Go(jω) in a lower frequency region.

Figure 6:
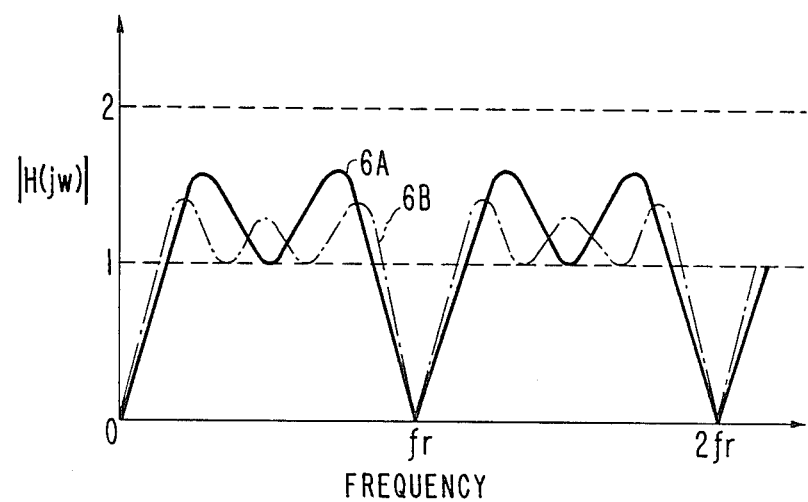
FIG. 6 shows two amplitude-frequency characteristics for explaining advantages of the present invention.

FIG. 6 shows two examples of the amplitude-frequency characteristics of H(jω) in a lower frequency region, where the following relationship is assumed:

$$\sum_{m=1}^{Fd} Bm\, Zd^{-m} = 1 \tag{16}$$

The amplitude-frequency characteristics 6A and 6B in FIG. 6 correspond to the cases of (N=2, W1=0.5, W2=0.5, D=1) and (N=3, W1=0.33333, W2=0.33333, W3=0.33333, D=1), respectively. Each of the amplitude-frequency characteristics 6A and 6B is a function of the frequency fr with a period equal to L times the renewing cycle period Tr, where $$fr = 1/(LTr) \tag{17}$$

Notice that the amplitudes of H(jω) are equal to 0 at the frequencies kfr (k=0, 1, 2, ...). As the result of this, the amplitudes of Gx(jω) are also equal to 0 at those frequencies. The amplitude of H(jω) at another frequency is equal to or almost equal to 1, which means that the amplitude of Gx(jω) is equal to or almost equal to the amplitude of Go(jω). Thus, the control system of the embodiment of the present invention has a remarkably improved robustness to torque disturbances, especially at the frequencies kfr (k=0, 1, 2, ...).

In the case of the control system for controlling the speed of the motor explained hereinbefore, it is preferable that the time of L renewing cycles is equal to an integral multiple of the one revolutional period of the motor. That is, $$LTr = K/fm \tag{18}$$

or $$LQ = KPa \tag{19}$$

where K is a positive integer. The reason for this is that the control system for controlling the speed of a motor has many harmonic components of the torque disturbances synchronized with the motor speed fm, but those harmonic components of the torque disturbances have little influences on the motor speed fm of the embodiment of the present control system with the relationship Eq. (18) or Eq. (19).

The control system of the embodiment of the present invention shown by the combination of FIG. 1, FIG. 2 and FIG. 3 uses comparably a small size of RAM, which will be explained hereinbelow. The selecting task block 3Ca in the memorizing block 3C selects to do or undo the tasks of the composing block 3Cb, the filtering error block 3Cc and the renewing block 3Cd corresponding to the first count variable Ia. The microprocessor 13A excutes only once a set of the tasks of those blocks 3Cb, 3Cc and 3Cd at every Q times of the tasks of the error block 3A and the output block 3B within the Q detecting periods (QTd=Tr). The number of the memorized values M[Ib] (Ib=0, 1, ..., NL−1) of the renewing block 3Cd is NL which corresponds to the word size of RAM, and L is equal to KPa/Q from the Eq. (19). Pa is the detecting number of the error block 3A per one revolution of the DC motor 11A, and Pa is usually a large number, in this case, Pa=2000. K is a positive integer for determining the frequency fr, and K may be 1 or 2. N is a positive number for determining mainly the robustness to disturbances at a frequency region between kfr to (k+1)fr (k=0, 1, ...), and N may be 1 or 2 or 3. So, the RAM size NL is greatly influenced by the integer Q, and larger Q can make the RAM size smaller. In the case of Pa=2000, K=1, N=2 and Q=10, the RAM size NL of the present invention with the selecting task block 3Ca becomes only 400 words which is much smaller than 4000 words in the case without the selecting task block 3Ca. So, the RAM size of the control system of the present invention has been remarkably reduced.

Notice that the reduction of the RAM size of the present invention has little influences to the robustness to disturbances of the control system. The reasons for this are below:

(1) The controlled frequency region of the control system is much smaller than 1/10 of the frequency of the sensed signal Aa.

(2) Most of torque disturbances in the control system are usually components corresponding to the rotational speed fm of the DC motor 11A in a lower part of the controlled frequency region.

So, the control system of the present invention using the small size of RAM can cover on a necessary lower frequency region.

It is preferable that the mixed values for renewing the memorized values are computed by using the filtered error signal Ec, not the error signal E directly. The reason for this is that if the error signal E has components higher than (Pa/Q)fm caused by torque disturbances or electrical noises, the sampling operation of the memorizing block 3C converts the frequencies of the components lower in the memorized values M[Ib] (Ib=0, 1, ..., NL−1) which cause harmful influences in the control system. So, the filtering error block 3Cc has a great advantage for reducing the above harmful influences.

Figure 7:
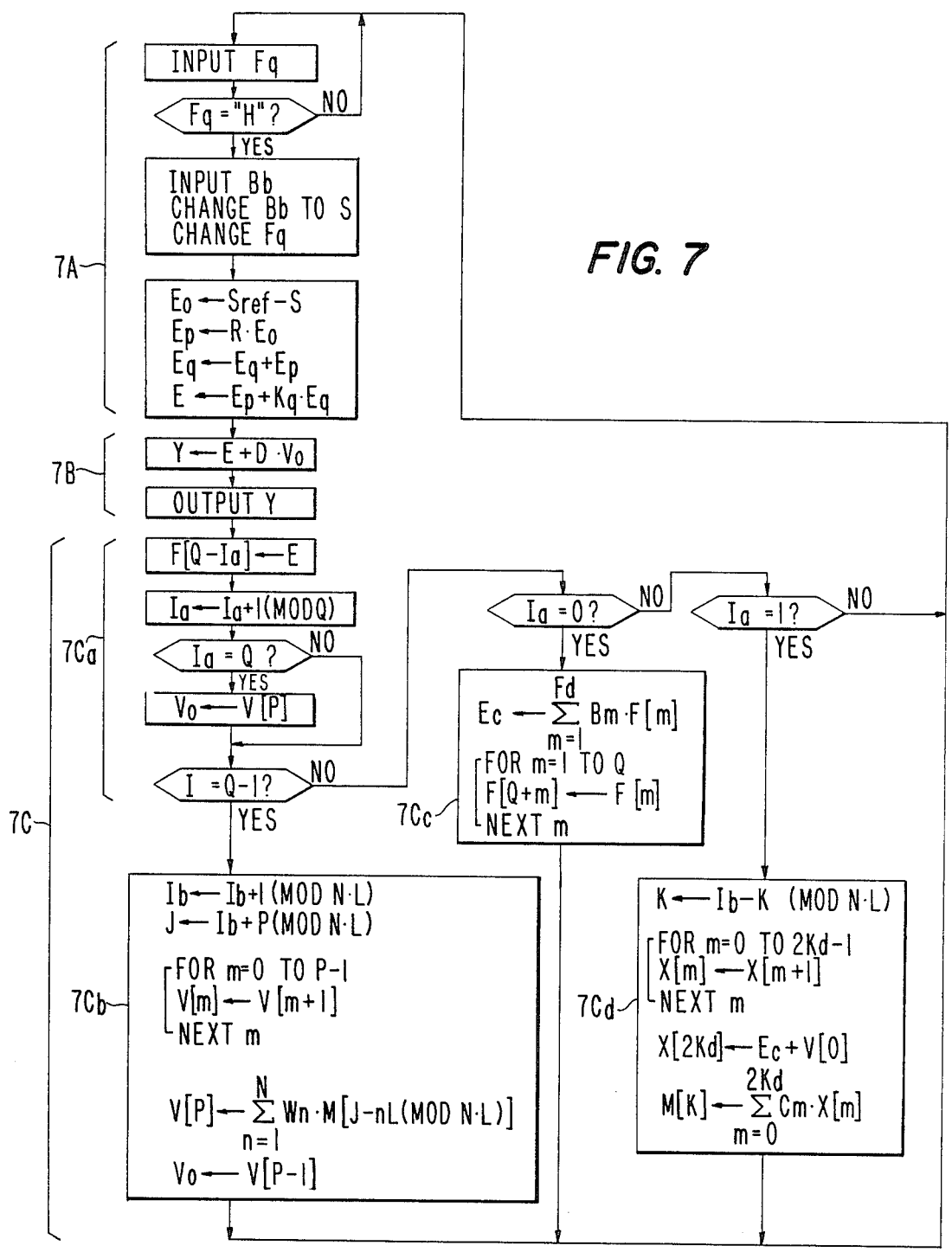
FIG. 7 is another flow diagram of the operation of the microprocessor which represents another embodiment of a control system according to the present invention with the combination of FIG. 1, FIG. 2 and FIG. 7.

FIG. 7 shows another flow diagram of the operation of the microprocessor 13A in the controlling block 13, which represents another embodiment of the present invention by the combination of FIG. 1, FIG. 2 and FIG. 7. The flow diagram of FIG. 7 will be explained hereinbelow.

[AN ERROR BLOCK 7A (AN ERROR SIGNAL PRODUCING STEP)]

(7A-1) The flag signal Fq is checked untill the flag signal Fq becomes "H". That is, the microprocessor 13A is triggered so as to execute the following procedure at the timing when the speed detector 12B obtains a new detected code corresponding to the current speed of the DC motor 11A.

(7A-2) The detected signal Bb, the held content of the counter 34, is inputted and changed to the digital or coded value S. Then, the contents of the counter 34 and the D-type flip-flop 35 are reset by making the reset signal Rr "H" for a very short time.

(7A-3) A difference value Eo is computed between the detected value S and a predetermined value Sref corresponding to the aimed speed. That is, $Eo=Sref−S$.

(7A-4) A proportional value Ep is obtained by multiplying the difference value Eo with a predetermined positive value R. That is, $Ep=REo$. An integral value Eg is obtained by adding the old Eg and the proportional value Ep. That is, $Eg=Eg+Ep$. An error signal E is computed by mixing the proportional value Ep and the integral value Eg with a ration of 1:Kg, where Kg is a positive constant. That is, $E=Ep+KgEg$. Thus, the error block 7A includes a proportional-integral filter means so that the error signal E has not only the proportional part but also the integral part of the difference value Eo. New value of the error signal E is obtained at intervals of the detecting period equal to the period of the sensed signal Aa.

[AN OUTPUT BLOCK 7B (A CONTROL SIGNAL PRODUCING STEP)]

(7B-1) An output signal Y is obtained by mixing the error signal E and a composite value Vo of a composing block 7Cb in a memorizing block 7C, described later, with a ratio of 1:D, where D is a positive real at most equal to 1.5 and at least equal to 0.25.

(7B-2) The output signal Y is outputted to the D/A converter 13C as the control signal Cs of the controlling block 13.

[A MEMORIZING BLOCK 7C (A MEMORIZING STEP)]

The memorizing block 7C comprises a selecting task block 7Ca, the composing block 7Cb, a filtering error block 7Cc and a renewing block 7Cd.

<SELECTING TASK BLOCK 7Ca>

(7Ca-1) The error signal E at this timing is stored in a register F[Q−Ia], where Q is an integer at least equal to 3 and Ia is a first count variable. That is, $F[Q−Ia]=E$.

(7Ca-2) The first count variable Ia is incremented with a modulo number Q. That is, '$Ia=Ia+1$ (MOD Q)' means '$Ia=Ia+1$ and Ia=0 if Ia=Q'. Thus, the first count variable Ia varies from 0 to Q−1 and increments the number in a circular form at every detecting timing of the speed detector 12B.

(7Ca-3) If Ia=Qa, the composite value Vo used in the output block 7B after the next detecting timing is replaced by another composite value V[P] which is the newest, where Qa is an integer between 0 to Q−1. If Ia is not equal to Qa, no substitution is excuted.

(7Ca-4) If $Ia=Q−1$, the microprocessor 13A excutes the task of the composing block 7Cb. If Ia=0, the microprocessor 13A executes the task of the filtering error block 7Cc. If Ia=1, the microprocessor 13A excutes the task of the renewing block 7Cd. If Ia is not equal to Q−1, 0 or 1, that is, Ia is from 2 to Q−2, the operation of the microprocessor 13A goes back to the task of the error block 7A.

<A COMPOSING BLOCK 7Cb (A COMPOSING STEP)>

(7Cb-1) A second count variable Ib is incremented with a modulo number NL, where L is an integer at least equal to 2 and preferably equal to an integral multiple of Pa/Q and N is an positive integer including 1. That is, '$Ib=Ib+1$ (MOD NL)' means '$Ib=Ib+1$ and Ib=0 if Ib=NL'. Thus, the second count variable Ib varies from 0 to NL−1 and increments the number in a circular form at every Q detecting timings of the speed detector 12B.

(7Cb-2) An operation of '$J = Ib + P$ (MOD NL)' is executed to obtain an integer J proceeding the second count variable Ib by P, where P is an integer at most equal to 5 and at least equal to 1. Preferable number of P is changed according to Q, Qa and Fd.

(7Cb-3) Another set of registers V[m] (m=0, ..., P) are used to store composite values. The content of the register V[m+1] is transferred to the register V[m] from m=0 to m=P−1.

(7Cb-4) The newest composite value V[P] is computed by combining linearly a set of N memorized values M[J−nL (MOD Nl)] (n=1, ..., N) with positive coefficients Wn (n=1, ..., N) from n=1 to n=N, where the N memorized values M[J−nL (MOD NL)] (n=1, ..., N) have been renewed at intervals of L renewing cycles. That is, $$V(P) = \sum_{n=1}^{N} Wn \, M(J - nL \, (MOD \, NL)) \quad (20)$$

where the coefficients Wn (n=1, ..., N) have the same relationships of Eq. (2) to Eq. (4). As the result of this, a plurality of the composite values V[m] (m=0, ..., P), sequential with respect to the timings, are obtained. The composite value Vo used in the output block 7B after the next detecting timing is substituted by the composite value V[P−1] which is newer one. Notice that V[0] is the oldest composite value for using in the renewing block 7Cd at the renewing timing, V[P] is the newest composite value for using in the output block 7B at future timings, and V[P] and V[0] have an interval of P renewing cycle periods. So, the composing block 7Cb computes the composite values V[m] (m=0, ..., P) for future use. After the task of the composing block 7Cb, the operation of the microprocessor 13A goes back to the task of the error block 7A.

<A FILTERING ERROR BLOCK 7Cc (A FILTERED ERROR SIGNAL PRODUCING STEP)>

(7Cc-1) A filtered error signal Ec is computed by combining linearly a plurality of values F[m] (m=1, 2, ..., Fd) which are values of the error signal E sequential with respect to the timings obtained, where Fd is a positive integer at least equal to 2 and at most equal to 2Q. That is, $$Ec = \sum_{m=1}^{Fd} Bm \, F(m) \quad (21)$$

where the coefficients Bm are positive and have the relationships of Eq. (6) and Eq. (7). After the computation of the filtered error signal Ec, the values F[m] (m=1, 2, ..., Q) are transferred to the registers F[Q+m] (m=1, 2, ..., Q), respectively. Notice that the values F[m] (m=1, 2, ..., 2Q) at the computing timing of the filtered signal Ec are those of the error signal E sequential with respect to timings obtained. Notice also that the filtering error block 7Cc with the relationships of Eq. (21), Eq. (6) and Eq. (7) has a low-pass digital filter characteristics which has a gain almost equal to 1 at a lower frequency region and a reduced gain much smaller than 1 at a higher frequency region. After the task of the filtering error block 7Cc, the operation of the microprocessor 13A goes back to the task of the error block 7A.

<A RENEWING BLOCK 7Cd (A RENEWING STEP)>

(7Cd-1) An integer K is computed by subtracting an integer Kd from the second count variable Ib with the modulo number NL, where Kd is an positive integer and preferably Kd=2.

(7Cd-2) A set of registers X[m] (m=0, 1, ..., 2Kd) are used to compute a renewing value. The content of the register K[m+1] is transferred to the register X[m] sequentially from m=0 to $m = 2Kd - 1$. The content of the register X[2Kd] is changed by a mixed value of the filtered error signal Ec of the filtering error block 7Cc and a composite value V[0] of the composing block 7Cb with a ratio of 1:1. That is, $X[2Kd] = Ec + V[0]$. As the result of this, 2Kd+1 of the mixed values (Ec+V[0]), sequential with respect to the timings obtained, are stored in those registers X[m] (m=0, 1, ..., 2Kd).

(7Cd-3) A memorized value M[K], stored at the address corresponding to the integer K in the RAM of the memory 13B, is renewed by a linear combination of the mixed values stored in the registers X[m] (m=0, 1, ..., 2Kd) with positive coefficients Cm (m=0, 1, ..., 2Kd). That is, $$M(K) = \sum_{m=0}^{2Kd} Cm \, X(m) \quad (22)$$

where the coefficients Cm have the following relationships:

$$C_m = C_{2Kd-m} \, (m = 0, 1, \ldots, Kd) \quad (23)$$

$$\sum_{m=0}^{2Kd} Cm = 1 \quad (24)$$

The renewed memorized value M[K] is held untill the next renewing time of M[K], that is, the NL renewing cycles later. As the result of this, the NL memorized values M[0] to M[NL−1] are obtained, and the NL memorized values are sequentially and periodically renewed at intervals of the renewing cycle period equal to Q times the detecting period. After the task of the renewing block 7Cd, the operation of the microprocessor 13A goes back to the task of the error block 7A.

Figure 3:
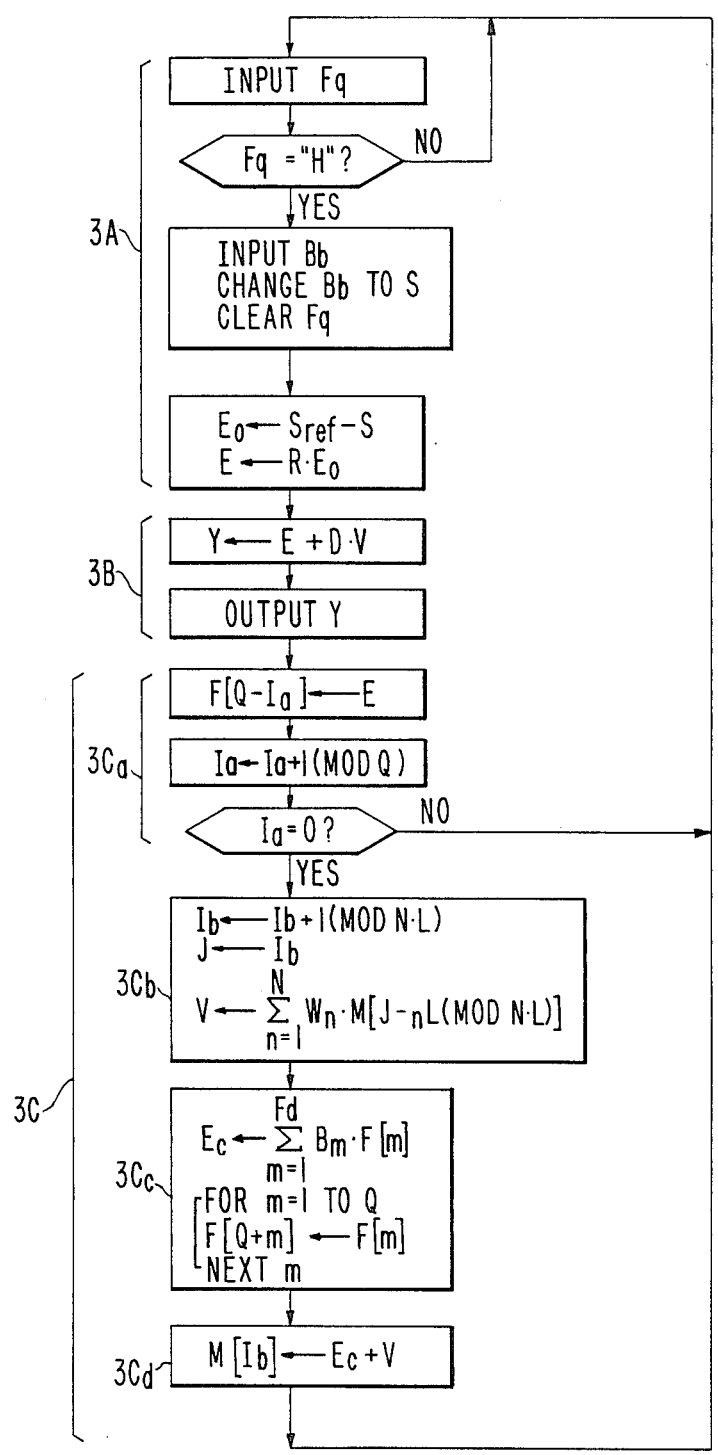
FIG. 3 is a flow diagram of the operation of the microprocessor which represents an embodiment of a method of controlling a control system according to the present invention with the combination of FIG. 1, FIG. 2 and FIG. 3.
Figure 4:
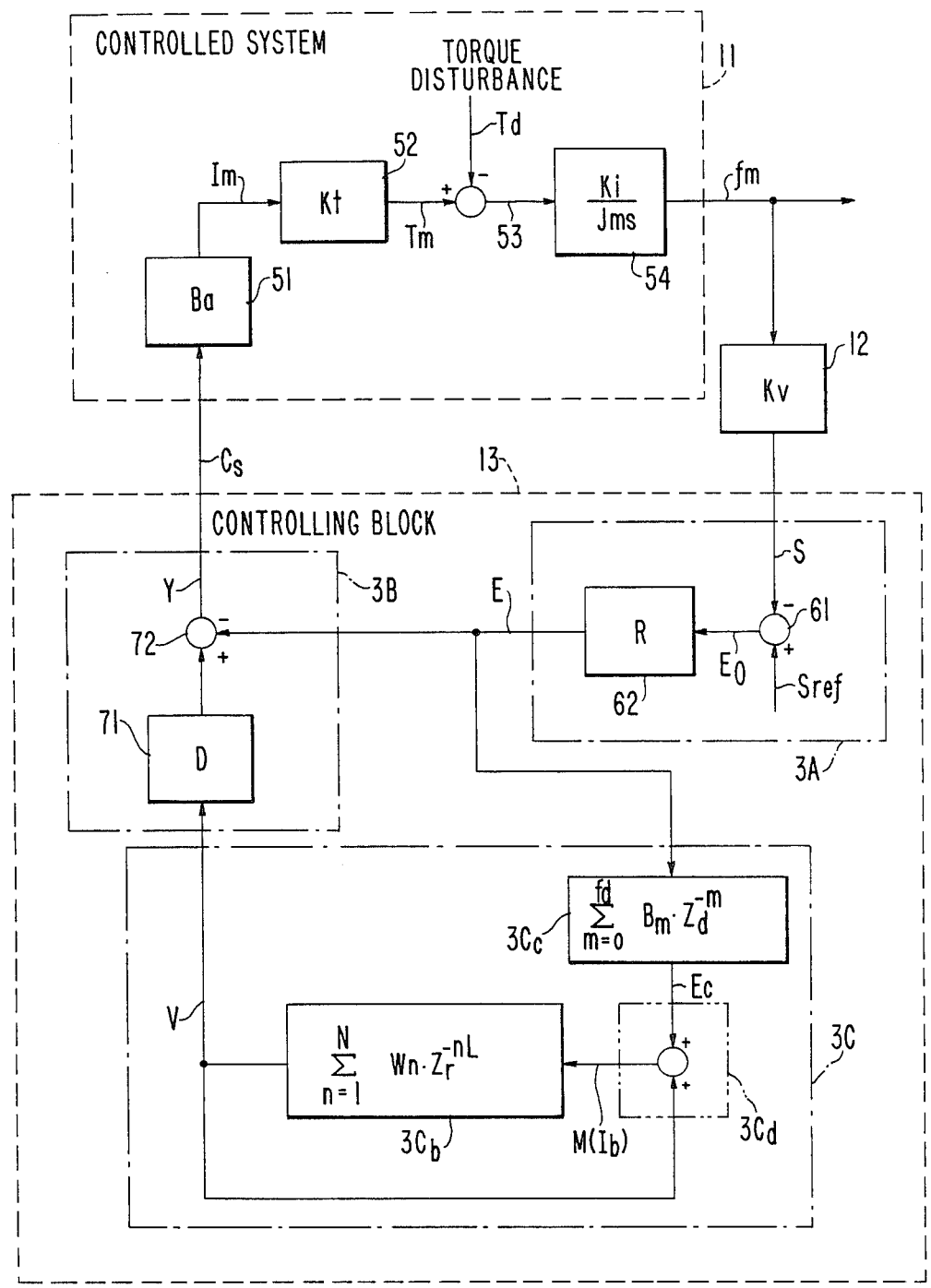
FIG. 4 is a control block diagram of the embodiment of the present invention shown by the combination of FIG. 1, FIG. 2 and FIG. 3.

The embodiment of the present invention by the combination of FIG. 1, FIG. 2 and FIG. 7 further has the following advantages;

(1) The robustness to disturbances of this embodiment is more improved than that of the embodiment shown by the combination of FIG. 1, FIG. 2 and FIG. 3, because the error block 7A includes a proportional-integral filter means.

(2) The task of the microprocessor 13A in a detecting period is greatly reduced, because the task of the memorizing block 7C is divided into three subtasks of the composing block 7Cb, the filtering error block 7Cc and the renewing block 7Cd which have many computations using multiple of numbers. This makes the computation delay of the microprocessor 13A small, and a usual microprocessor without a hardware multiplier can be used as the microprocessor 13A in this embodiment.

(3) The improvements of the composing block 7Cb and the renewing block 7Cd make the control system of this embodiment stabilized. Especially, to use newer or the newest composite value in the output block 7B compensates for the time delay of the filtering error block 7Cc.

Figure 8:
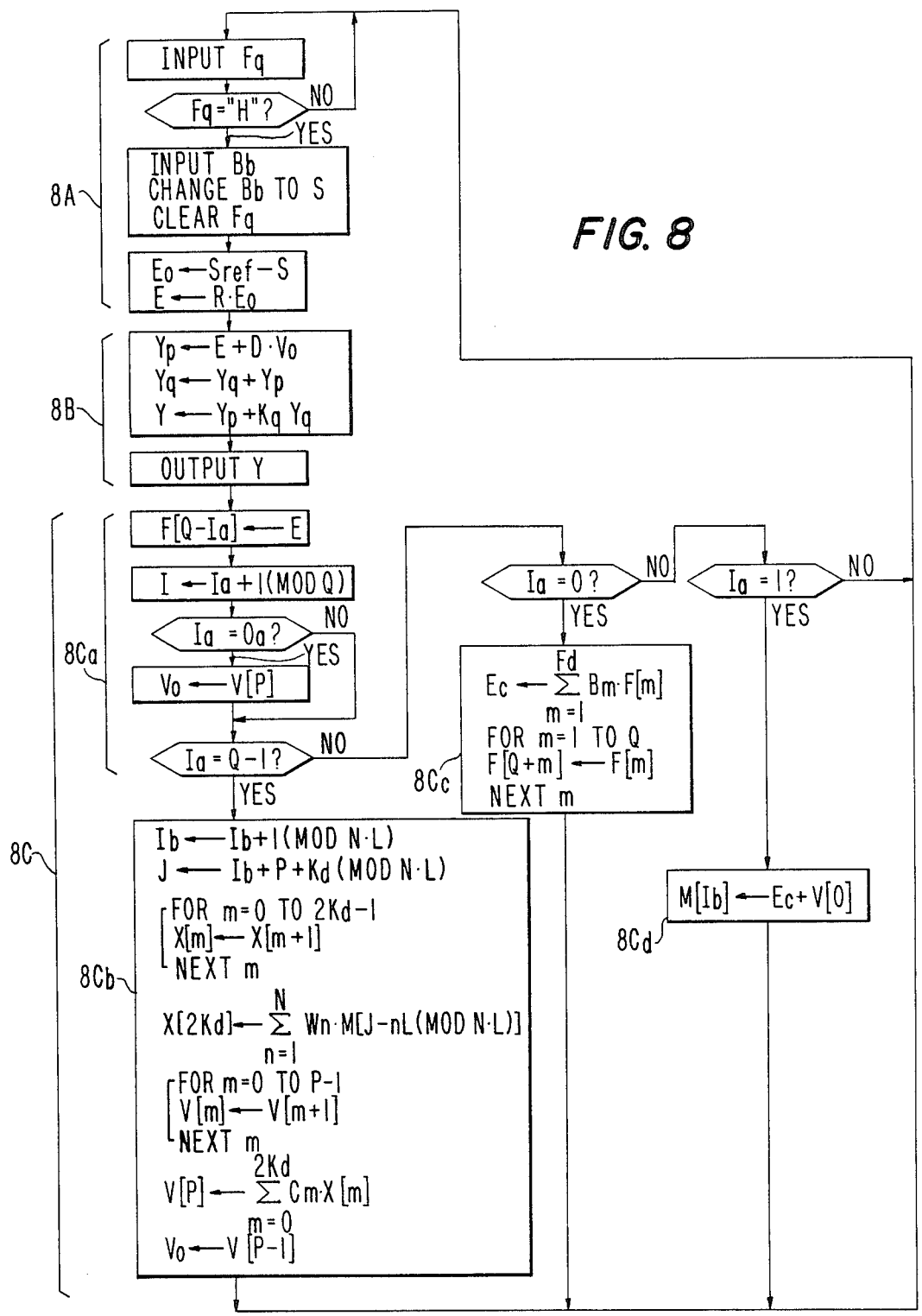
FIG. 8 is still another flow diagram of the operation of the microprocessor which represents still another embodiment of a control system according to the present invention with the combination of FIG. 1, FIG. 2 and FIG. 8.

FIG. 8 shows still another flow diagram of the operation of the microprocessor 13A in the controlling block 13, which represents still another embodiment of the present invention by the combination of FIG. 1, FIG. 2 and FIG. 8. The flow diagram of FIG. 8 is explained hereinbelow.

[AN ERROR 8A (AN ERROR SIGNAL PRODUCING STEP)]

(8A-1) The flag signal Fq is checked untill the flag signal Fq becomes "H". That is, the microprocessor 13A is triggered so as to execute the following procedure at the timing when the speed detector 12B obtains a new detected code corresponding to the current speed of the DC motor 11A.

(8A-2) The detected signal Bb, the held content of the counter 34, is inputted and changed to the digital or coded value S. Then, the contents of the counter 34 and the D-type flip-flop 35 are reset by making the reset signal Rr "H" for a very short time.

(8A-3) The difference value Eo is computed between the detected value S and a predetermined value Sref corresponding to the aimed speed. That is, $Eo=Sref-S$. Then, an error signal E is obtained by multiplying the difference value Eo with a predetermined positive value R. That is, $E=REo$. New value of the error signal E is obtained at intervals of the detecting period equal to the period of the sensed signal Aa.

[AN OUTPUT BLOCK 8B (A CONTROL SIGNAL PRODUCING STEP)]

(8B-1) A proportional value Yp is obtained by mixing the error signal E and a composite value Vo of a composing block 8Cb in a memorizing block 8C, described later, with a ration of 1:D, where D is a positive real, at most equal to 1.5 and at least equal to 0.25. An integral value Yg is computed by adding the old Yg and the proportional value Yp. That is, $Yg=Yg+Yp$. An output signal Y is computed by mixing the proportional value Yp and the integral value Yg with a ratio of 1:Kg, where Kg is a positive constant. That is, $Y=Yp+KgYg$.

(8B-2) The output signal Y is outputted to the D/A converter 13C as the control signal Cs of the controlling block 13. Thus, the output block 8B includes a proportional-integral filter means so that the output signal Y has not only the proportional part but also the integral part of the mixed value (E+DVo).

[A MEMORIZING BLOCK 8C (A MEMORIZING STEP)]

The memorizing block 8C comprises a selecting task block 8Ca, the composing block 8Cb, a filtering error block 8Cc and a renewing block 8Cd.

<A SELECTING TASK BLOCK 8Ca>

(8Ca-1) The error signal E at this timing is stored in a register F[Q−Ia], where Q is an integer at least equal to 3 and Ia is a first count variable. That is, $F[Q-Ia]=E$.

(8Ca-2) The first count variable Ia is incremented with a modulo number Q. That is, '$Ia=Ia+1$ (MOD Q)' means '$Ia=Ia+1$ and Ia=0 if Ia=Q'. Thus, the first count variable Ia varies from 0 to Q−1 and increments the number in a circular form at every detecting timing of the speed detector 12B.

(8Ca-3) If Ia=Qa, the composite value Vo used in the output block 8B after the next detecting timing is substituted by anouther composite value V[P] which is the newest, where Qa is an integer between 0 to Q−1. If Ia is not equal to Qa, no substitution is excuted.

(8Ca-4) If Ia=Q−1, the microprocessor 13A excutes the task of the composing block 8Cb. If Ia=0, the microprocessor 13A executes the task of the filtering error block 8Cc. If Ia=1, the microprocessor 13A excutes the task of the renewing block 8Cd. If Ia is not equal to Q−1, 0 or 1, that is, Ia is from 2 to Q−2, the operation of the microprocessor 13A goes back to the task of the error block 8A.

<A COMPOSING BLOCK 8Cb (A COMPOSING STEP)>

(8Cb-1) A second count variable Ib is incremented with a modulo number NL, where L is an integer at least equal to 2 and preferably equal to an integral multiple of Pa/Q and N is an positive integer including 1. That is, '$Ib=Ib+1$ (MOD NL)' means '$Ib=Ib+1$ and Ib=0 if Ib=NL'. Thus, the second count variable Ib varies from 0 to NL−1 and increments the number in a circular form at every Q detecting timings of the speed detector 12B.

(8Cb-2) An operation of '$J=Ib+P+Kd$ (MOD NL)' is excuted to obtain an integer J proceeding the second count variable Ib by P+Kd, where P is an integer at most equal to 5 and at least equal to 1, and Kd is an integer at least equal to 2 and preferably Kd=2. Preferably number of P is changed according to Q, Qa and Fd.

(8Cb-3) A set of registers X[m] (m=0, 1, ..., 2Kd) are used to compute composite values. The content of the register X[m+1] is transferred to the register X[m] sequentially from m=0 to $m=2Kd-1$.

(8Cb-4) The content of the register X[2Kd] is changed by a linear combination of a set of N memorized values M[J−nL (MOD NL)] (n=1, ..., N) with positive coefficients Wn (n=1, ..., N) from n=1 to N=N, where the N memorized values M[J−nL (MOD NL)] (n=1, ..., N) have been renewed at intervals of L renewing cycles. That is, $$X(2Kd) = \sum_{n=1}^{N} Wn\, M(J - nL\ (MOD\ NL)) \qquad (25)$$

where the coefficients Wn (n=1, ..., N) have the same relationships of Eq. (2) to Eq. (4). As the result of this, a plurality of linear combinations X[m] (m=0, ..., 2Kd), sequential with respect to the timings, are obtained.

(8Cb-5) Another set of registers V[m] (m=0, ..., P) are used to store composite values. The content of the register V[m+1] is transferred to the register V[m] from m=0 to $m=P-1$.

(8Cb-6) The newest composite value V[P] of the composing block 8Cb is computed by combining linearly the linear combinations X[m] (m=0, 1, ..., 2Kd) with positive coefficients Cm (m=0, 1, ..., 2Kd). That is, $$V(P) = \sum_{m=1}^{2Kd} Cm\, X(m) \qquad (26)$$

where the coefficients Cm have the relationships of Eq. (23) and Eq. (24). As the result of this, a plurality of composite values V[m] (m=0, 1, ..., P), sequential with respect to the timings, are obtained. Notice that V[0] is the oldest composite value for using in the renewing block 8Cd at the next renewing timing, V[P] is the newest composite value for using in the output block 8B at future timing, and V[P] and V[0] have an interval of P renewing cycle periods. So, the composing block 8Cb computes the compositive values V[m] (m=0, 1, ..., P) for future use. After the task of the composing block 8C*b*, the operation of the microprocessor 13A goes back to the task of the error block 8A.

<A FILTERING ERROR BLOCK 8C*c* (A FILTERED ERROR SIGNAL PRODUCING STEP)>

(8C*c*-1) A filtered error signal Ec is computed by combining linearly a plurality of values F[m] (m=1, 2, ..., Fd) which are values of the error signal E sequential with respect to the timings obtained, where Fd is a positive integer at least equal to 2 and at most equal to 2Q. That is, $$Ec = \sum_{m=1}^{Fd} Bm \, F(m) \qquad (27)$$

where the coeffients Bm are positive and have the relationships of Eq. (6) and Eq. (7). After the computation of the filtered error signal Ec, the values F[m] (m=1, 2, ..., Q) are transferred to the registers F[Q+m] (m=1, 2, ..., Q), respectively. Notice that the values F[m] (m=1, 2, ..., 2Q) at the computing timing of the filtered signal Ec are those of the error signal E sequential with respect to timings obtained. Notice also that the filtering error block 7C*c* with the relationships of Eq. (27), Eq. (6) and Eq. (7) has a low-pass digital filter characteristics which has a gain almost equal to 1 at a lower frequency region and a reduced gain much smaller than 1 at a higher frequency region. After the task of the filtering error block 8C*c*, the operation of the microprocessor 13A goes back to the task of the error block 8A.

<A RENEWING BLOCK 8C*d* (A RENEWING STEP)>

(8C*d*-1) A memorized value M[Ib], stored at the address corresponding to the second count variable Ib in the RAM of the memory 13B, is renewed by a mixed value of the filtered error signal Ec and a composite value V[0] of the composing block 8C*b* with a ratio of 1:1. That is, $M[Ib]=Ec+V[0]$. The renewed memorized value M[Ib] is held until the next renewing time of M[Ib], that is, the NL renewing cycles later. As the result of this, the NL memorized values M[0] to M[NL−1] are obtained, and the NL memorized values are sequentially and periodically renewed. After the task of the renewing block 8C*d*, the operation of the microprocessor 13A goes back to the task of the error block 8A.

The embodiment of the present invention by the combination of FIG. 1, FIG. 2 and FIG. 8 also has the following advantages;

(1) The robustness to disturbances of this embodiment is more improved than that of the embodiment shown by the combination of FIG. 1, FIG. 2 and FIG. 3, because the output block 8B includes a proportional-integral filter means.

(2) Task of the microporcessor 13A in a detecting period is reduced, because the task of the memorizing block 8C is divided into three subtasks of the composing block 8C*b*, the filtering error block 8C*c* and the renewing block 8C*d* which have many computations using multiple of numbers. This makes computation delay of the microprocessor 13A small, and a usual microprocessor without a hardwear multiplier can be used as the microprocessor 13A in this embodiment.

(3) The improvement of the composing block 8C*b* makes the control system of this embodiment stabilized. Especially, to use newer or the newest composite value in the output block 8B compensates the time delay of the filtering error block 8C*c*.

In each of the above embodiments to the present invention, it is very advantageous for improving the robustness to disturbances that the microprocessor 13A excutes the task of the memorizing block in the rest time after finishing the tasks of the error block and the output block, because a computing time delay for obtaining a new value of the control signal with a new value of the detected signal can be minimized. The computing time delay is the essential factor to determine an overall control gain, and smaller computing time delay makes the overall control gain larger. In particular, it is very important for minimizing the computing time delay that the composing block in the memorizing block prepares one or more composite values for furture use. Notice also that it is not so important to minimaize a computing time for the task of the memorizing block, because the microprocessor 13A excutes once the task of the memorizing block in the rest time of the Q detecting periods except Q times the computing time delay for the tasks of the error block and the output block. It is preferable that the memorizing block is divided into at least two subtasks and the microprocessor 13A excutes at most one of the subtasks at every detecting period in the rest time after finishing the tasks of the error block and the output block.

Specific embodiments of the present invention have been described hereinabove with reference to the accompanying drawings, but it is to be understood that the invention is not limited to those specific embodiments, and that various changes and modifications may be effected therein by one skilled in the art without departing from the scope or spirit of the invention as defined in the appended claims. For example, the error signal can be a signal composed with a speed error and a phase error of a motor so as to control not only the speed but also the phase of the motor, when the control system for a motor has a phase detector as well as a speed detector.

What is claimed is:

1. A method of controlling a system, comprising the following steps:
   a detecting step for producing a detected signal corresponding to a controlled variable of a controlled system;
   an error signal producing step for producing an error signal corresponding to the detected signal of said detecting step periodically at intervals of a detecting period of time;
   a storing step for renewing a plurality of stored values sequentially and periodically at intervals of a renewing cycle period of time equal to Q times the detecting period each by a value corresponding to a first mixed value which is obtained by mixing the error signal of said error signal producing step and one or more of the stored values having been renewed at intervals of L renewing cycles, where each of Q and L is an integer at least equal to 2; and
   a control signal producing steps for producing a control signal corresponding to a second mixed value which is obtained by mixing the error signal of said error signal producing step and one or more stored values of said storing steps, and supplying said controlled system with the control system so as to control the controlled variable of said controlled system.

2. A method as claimed in claim 1,
wherein said sotring step computes periodically at least one linear combination of a set of N stored values having been renewed at the intervals of L renewing cycles with coefficients having a same sign, where N is an integer at least equal to 2.

3. A method as claimed in claim 1,
werein said storing step includes a filtered error signal producing step for filtering the error signal with a filter having a low-pass filter characteristics for producing a filtered error signal.

4. A method as claimed in claim 3,
wherein said filtered error signal producing step produces the filtered error signal by combining linearly a plurality of values of the error signal of said error signal producing step sequential with respect to the timings obtained.

5. A method as claimed in claim 1,
wherein said error signal producing step includes a proportional-integral filtering step so that the error signal has a proportional part and an integral part of the detected signal.

6. A method as claimed in claim 1,
wherein said control signal producing step includes a proportional-integral filtering step so that the control signal has a proportional part and an integral part of the second mixed value.

7. A method as claimed in claim 1,
wherein said storing step comprises:
a filtered error signal producing step for filtering the error signal with a filter having a low-pass filter characteristics for producing a filtered error signal;
a renewing step for renewing the stored values sequentially and periodically each by a value corresponding to the first mixed value; and
a composing step for producing one or more composite values, each of the composite values corresponding to at least a linear combination of the one or more of the stored values of said renewing step having been renewed at the intervals of L renewing cycles; and
wherein the first mixed value of said renewing step is obtained by mixing the filtered error signal and a composite value of said composing step.

8. A method as claimed in claim 7,
wherein said composing step computes periodically at least one linear combination of a set of N stored values having been renewed at the intervals of L renewing cycles with coefficients having a same sign, where N is an integer at least equal to 2.

9. A method as claimed in claim 7,
wherein a set of the tasks of said filtered error signal producing step, said renewing step and said composing step is executed once at every Q times of the tasks of said error signal producing step and said control signal producing step within the Q detecting periods.

10. A method as claimed in claim 9,
wherein the set of the tasks of said filtered error signal producing step, said renewing step and said composing step is divided into at least two subtasks, and at most one of the subtasks is executed at every detecting period in the rest time after finishing the tasks of said error signal producing step and said control signal producing step.

11. A method as claimed in claim 7,
wherein said renewing step renews periodically one of the stored values by a linear combination of a set of the first mixed values sequentially with respect to the timings obtained.

12. A method as claimed in claim 7,
wherein the second mixed value of said control signal producing step is obtained by mixing the error signal of said error signal producing step and at least one composite value of said composing step.

13. A method as claimed in claim 7,
wherein said composing step computes each of the composite values by combining linearly a set of the linear combinations of the one or more of the stored values sequentially with respect to the timings obtained.

14. A method as claimed in claim 7,
wherein said filtered error signal producing step produces the filtered error signal by combining linearly a plurality of values of the error signal of said error signal producing step sequentially with respect to the timings obtained.

15. A method of controlling a system, comprising the following steps:
a detecting step for producing a detected signal corresponding to a controlled variable of a controlled system;
an error signal producing step for producing an error signal corresponding to the detected signal of said detecting step periodically at intervals of a detecting period of time;
a filtered error signal producing step for producing a filtered error signal by combining linearly a plurality of values of the error signal of said error signal producing step sequentially with respect to the timings obtained;
a renewing step for renewing a plurality of stored values sequentially and periodically at intervals of a renewing cycle period of time equal to Q times the detecting period each by a value corresponding to a first mixed value which is obtained by mixing the filtered error signal and a composite value of composing step, where Q is an integer at least equal to 2;
said composing step for producing one or more composite values, each of said composite values corresponding to at least a linear combination of one or more of the stored values of said renewing step, said one or more of the stored values having been renewed at intervals of L renewing cycles, where L is an integer at least equal to 2; and
a control signal producing step for producing a control signal corresponding to a second mixed value which is obtained by mixing the error signal of said error signal producing step and at least one composite value of said composing step, and supplying said controlled system with the control signal so as to control the controlled variable of said controlled system.

16. A method of controlling a system for a motor, comprising the following steps:
a driving step for supplying said motor with a power corresponding to a control signal;
a sensing step for obtaining a detected signal with a digital number corresponding to the speed of said motor at intervals of a detecting period of time proportional to the period of the sensed signal;
an error signal producing step for producing an error signal corresponding to the detected signal of said speed detecting step and including a proportional-integral filter/step so that the error signal has a proportional part and an integral part of the detected signal;

a storing step including a filtered error signal producing step for filtering the error signal with a filter having a low-pass filter characteristics for producing a filtered error signal, and renewing a plurality of stored values sequentially and periodically at intervals of a renewing cycle period equal to Q times the detecting period each by value corresponding to a first mixed value which is obtained by mixing the filtered error signal and one or more of the stored values which are at least an interval of L renewing cycle periods older, where each of Q and L is an integer at least equal to 2; and a control signal producing step for producing the control signal corresponding to a second mixed value which is obtained by mixing the error signal of said error signal producing step and one or more stored values of said storing steps, and supplying said driving step with the control signal.

17. A method as claimed in claim 16,
wherein the interval of L renewing cycle periods in said storing steps is equal to an integral multiple of the one revolution period of said motor.

18. A method as claimed in claim 16,
wherein said filtered error signal producing step produces the filtered signal by combining linearly a plurality of values of the error signal of said signal producing step sequentially with respect to the timings obtained.

19. A method as claimed in claim 16,
wherein said storing step comprises:
said filtered error signal producing step for producing a filtered error signal by combining linearly a plurality of values of the error signal of said error signal producing step sequentially with respect to the timings obtained;
a renewing step for producing one or more composite values, each of the composite values corresponding to at least a linear combination of the one or more of the stored values of said renewing step having been renewed at the intervals of L renewing cycles; and
wherein the first mixed value of said renewing step is obtained by mixing the filtered error signal of said filtered error signal producing step and a composite value of said composing step.

20. A method as claimed in claim 19,
wherein said composing step computes periodically at least one linear combination of a set of N stored values having been renewed at the intervals of L renewing cycles with coefficients having a same sign, where N is an integer at least equal to 2.

21. A method as claimed in claim 19,
wherein a set of the tasks of said filtered error signal producing, said renewing step and said composing step is executed once at every Q times of the tasks of said error signal producing step and said control signal producing step.

22. A method as claimed in claim 21,
wherein the set of the tasks of said filtered error signal producing step, said renewing step and said composing step is divided into at least two subtasks, and at most one of the subtasks is executed at every detecting period in the rest time after finishing the tasks of said error signal producing step and said control signal producing step.

23. A method as claimed in claim 19,
wherein said renewing step renews periodically one of the stored values by a linear combination of a set of the first mixed values sequentially with respect to the timings obtained.

24. A method as claimed in claim 19,
wherein the second mixed value of said control signal producing step and at least one composite value of said composing step.

25. A method as claimed in claim 19,
whein said composing step computes each of the composite values by combining linearly a set of the linear combinations of the one or more of the stored values sequential with respect to the timings obtained.

26. A method of controlling a controlled system for a motor, comprising:
a driving step for supplying said motor with a power corresponding to a control signal;
a signal step for producing a sensed signal with a frequency proportional to the speed of said motor;
a speed detecting step for obtaining a detected signal with a digital number corresponding to the speed of said motor at intervals of a detecting period of time proportional to the period of the sensed signal;
an error signal producing step for producing an error signal corresponding to the detected signal of said speed detecting step;
a storing step including a filtered error signal producing step for filtering the error signal with a filter having a low-pass filter characteristics for producing a filtered error signal, and renewing a plurality of stored vaues sequentially and periodically at intervals of a renewing cycle period equal to Q times the detecting period each by a value corresponding to a first mixed value which is obtained by mixing the filtered error signal and one or more of the stored values which are at least an interval of L renewing cycle periods older, where each of Q and L is an integer at least equal to 2;
a control signal producing step for producing the control signal corresponding to a second mixed value which is obtained by mixing the error signal of said error signal producing step and one or more stored values of said memorizing step, including a proportional-integral filter step so that the control signal has a proportional part and an integral part of the second mixed value, and supplying said driving step with the control signal.

27. A method as claimed in claim 26,
wherein the interval of L renewing cycle periods in aid storing step is equal to an integral multiple of one revolution period of said motor.

28. A method as claimed in claim 26,
wherein said filtered error signal producing step produces the filtered error signal combining linearly a plurality of values of the error signal of said error signal producing step sequentially with respect to the timings obtained.

29. A method as claimed in claim 26,
wherein said storing steps comprises:
said filtered error signal producing step for producing a filtered error signal by combining linearly a plurality of values of the error signal of said error signal producing step sequential with respect to the timings obtained;
a renewing step for renewing the stored values sequentially and periodically each by a value corresponding to the first mixed value; and a composing step for producing one or more composite values, each of the composite values corresponding to at least a linear combination of the one or more of the stored values of said renewing step having been renewed at the intervals of L renewing cycles; and wherein the first mixed value of said renewing step is obtained by mixing the filtered error signal and a composite value of said composing step.

30. A method as claimed in claim 29, wherein said composing means computes periodically at least one linear combination of a set of N stored values having been renewed at the intervals of L renewing cycles with coefficients having a same sign, where N is an integer at least equal to 2.

31. A method as claimed in claim 29, wherein a set of the tasks of said filtered error signal producing step, said renewing step and said composing step is executed once at every Q times of the tasks of said error signal producing step and said control signal producing step within the Q detecting periods.

32. A method as claimed in claim 31, wherein the set of the tasks of said filtered error signal producing step said renewing step and said composing step is divided into at least two subtasks, and at most one of the subtasks is executed at every detecting period in the rest time aftr finishing the tasks of said error signal producing step and said control signal producing step.

33. A method as claimed in claim 29, wherein said renewing step renews periodically one of the stored values by a linear combination of a set of the first mixed values sequentially with respect to the timings obtained.

34. A method as claimed in claim 29, wherein the second mixed value of said control signal producing step is obtained by mixing the error signal of said error signal producing step and at least one composite value of said composing step.

35. A method as claimed in claim 34, wherein the composite value of said composing step used in said control signal producing step is newer than that of said composing step used in said renewing step.

36. A method as claimed in claim 29, wherein said composing step computes each of the composite values by combining linearly a set of the linear combinations of the one or more of the stored values sequentially with respect to the timings obtained.

* * * * *